UNITED STATES PATENT OFFICE 2,606,213

REACTION PRODUCTS OF TRICHLOROMETHANE SULFONYL CHLORIDE WITH ALKENYL AROMATIC COMPOUNDS

Elbert C. Ladd, Passaic, and Lewis Y. Kiley, Hasbrouck Heights, N. J., assignors to United States Rubber Company, New York, N. Y., a corporation of New Jersey No Drawing. Application January 2, 1948, Serial No. 349

2 Claims. (Cl. 260—651)

This invention relates to new chemicals which are products of reaction of trichloromethane sulfonyl chloride with aromatic compounds containing an alkenyl substituent, and preferably but one alkenyl substituent, and which have the general formula

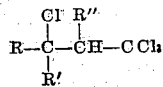

where R is an aromatic group of the benzene and naphthalene series or a sulfur-containing, or nitrogen-containing, or oxygen-containing heterocyclic group containing conjugated double bonds; R' is hydrogen, alkyl (containing from 1 to 12 carbon atoms), phenyl, chlorophenyl, alkoxy phenyl, or thienyl; R" is hydrogen, phenyl, halophenyl, carboxy, carbalkoxy, alkoxy, aryloxy, methylol, alkoxy methyl, or acyloxy methyl.

Exemplary of the chemicals of this invention are the following:

1,1,1,3-tetrachloro-3-phenylbutane
1,1,1,3-tetrachloro-3-beta-naphthylbutane
1,1,1,3-tetrachloro-3-p-chlorophenylbutane
1,1,1,3-tetrachloro - 3 - (2,5-dichlorophenyl) propane
1,1,1,3-tetrachloro-3-p-fluorophenylpropane
1,1,1,3-tetrachloro-3-p-bromophenylpropane
1,1,1,3-tetrachloro-3-m-chlorophenylpropane
1,1,1,3-tetrachloro-3-p-methylphenylpropane
1,1,1,3-tetrachloro-3-o-p-dimethylphenylpropane
1,1,1,3-tetrachloro-3-p-methoxyphenylpropane
1,1,1,3-tetrachloro-3-p-phenoxyphenylpropane
1,1,1,3-tetrachloro-3-p-cyanophenylpropane
1,1,1,3-tetrachloro-3-p-vinylphenylpropane
1,1,1,3-tetrachloro-3-p-sulfoxyphenylpropane
1,1,1,3-tetrachloro-3-p-acetamidophenylpropane
1,1,1,3-tetrachloro-3-p-nitrophenylpropane
1,1,1,3-tetrachloro-3-p-trifluoromethylphenylpropane
1,1,1,3-tetrachloro-3-alpha-thienylpropane
1,1,1,3-tetrachloro-3-alpha-furylpropane
1,1,1,3-tetrachloro-3-alpha-pyrrylpropane
1,1,1,3-tetrachloro-3,3-diphenylpropane
1,1,1,3-tetrachloro - 3,3 - bis-p-chlorophenylpropane
1,1,1,3-tetrachloro - 3,3 - bis - p - methoxyphenylpropane
1,1,1,3-tetrachloro-3,3-bis-alpha-thienylpropane
1,1,1,3-tetrachloro-3-phenylpentane
1,1,1,3-tetrachloro-3-phenylhexane
1,1,1,3-tetrachloro-3-phenylheptane
1,1,1,3-tetrachloro-3-phenyloctane
1,1,1,3-tetrachloro-3-phenyldecane
1,1,1,3-tetrachloro-3-phenylundecane
1,1,1,3-tetrachloro-3-phenyldodecane
1,1,1,3-tetrachloro-3-phenyltridecane
1,1,1,3-tetrachloro-3-phenyltetradecane
1,1,1,3-tetrachloro-3-phenylnonane
1,1,1,3-tetrachloro-2,3-diphenylpropane
1,1,1,3-tetrachloro - 2,3 - bis-p-chlorophenylpropane
1,1,1,3-tetrachloro-2-carboxy-3-phenylpropane
1,1,1,3-tetrachloro - 2 - carbethoxy-3-phenylpropane
1,1,1,3-tetrachloro-2-methylol-3-phenylpropane
1,1,1,3-tetrachloro - 2 - acetoxymethyl-3-phenylpropane
1,1,1,3-tetrachloro-2-methoxy-3-phenylpropane
1,1,1,3-tetrachloro-2-ethoxy-3-phenylpropane
1,1,1,3-tetrachloro-2-phenoxy-3-phenylpropane
1,1,1,3-tetrachloro - 2 - methoxymethyl-3-phenylpropane
1,1,1,3-tetrachloro-2-phenyl-3-nitropropane
1,1,1,2,3-pentachloro-3-phenylpropane Preferred classes are where R" is hydrogen as in

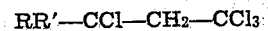

and where R' and R" are both hydrogen as in

In this reaction sulfur dioxide is eliminated and the fragments Cl₃C— and Cl— add to the ethylenic linkage of the alkenyl group. In one instance the reaction is illustrated as follows:

(1) Cl₃C—SO₂—Cl+CH₂=CH—C₆H₅→
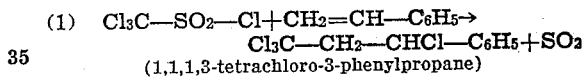
(1,1,1,3-tetrachloro-3-phenylpropane)

The reaction may be carried out in the presence or absence of an added source of free radicals such as ultra violet light or 0.1–15% by weight of a peroxygen compound, e. g., organic peroxides including diacetyl peroxide, dibenzoyl peroxide, and ter-butyl hydroperoxide, to promote the reaction. The reaction of our invention however proceeds in the absence of such promoters, and indeed their use is not recommended in cases where the alkenyl aromatic compound employed is readily polymerizable.

For each molar equivalent of the alkenyl-substituted aromatic compound there is used from 0.5 to 20 molar equivalents of trichloromethane sulfonyl chloride, the latter being preferably added at 25–125° C., and preferably from 50–100° C., for a time sufficient to effect reaction, such reaction times being ordinarily in the range of from 5 to 80 hours. In practice, the alkenyl-substituted aromatic compounds are preferably added incrementally to the reaction mixture, during the initial 10% of the reaction time. The reaction can be carried out in the presence or absence of an added source of free radicals, as previously defined, and in the presence or absence of a solvent or diluent such as a liquid hydrocarbon, e. g., benzene, an alcohol, e. g., methanol, ethanol, n-butanol, ethylene glycol monomethyl ether, ethylene glycol, diethylene glycol, propylene glycol, or an ether, e. g., diethyl ether.

The reaction products are isolated and purified by conventional techniques of organic chemistry including extraction, fractional distillation and crystallization.

The following examples disclose our invention in more detail; all parts are by weight:

Example 1

To a solution of 218 parts of trichloromethane sulfonyl chloride in 290 parts of benzene at 80° C. are gradually added a total of 40 parts of styrene in the course of 3.5 hours. Heating is then continued for an additional 21 hours after which the reaction mixture is fractionally distilled to yield approximately 10.9 parts of the new compound, 1,3,3,3-tetrachloropropylbenzene, B. 85–7° C./0.2 mm.; $n_D^{20}$ 1.5557;

| Analysis | Percent C | Percent H | Percent Cl |
|---|---|---|---|
| Found | 42.1 | 3.4 | 54.9 |
| Theory | 41.8 | 3.1 | 55.0 |

Example 2

In the manner of Example 1, a mixture of 218 parts of trichloromethane sulfonyl chloride, 40 parts of styrene and 10 parts of dibenzoyl peroxide dissolved in 356 parts of benzene yields 31 parts of the 1,3,3,3-tetrachloropropylbenzene.

While we have shown and described various embodiments of the invention, it is to be understood that the invention is susceptible to other modifications which appear within the spirit of the invention and the scope of the appended claims.

Having thus described our invention, what we claim and desire to protect by Letters Patent is:

1. The process of preparing compounds of the formula $$\begin{array}{cc} \text{Cl} & \text{R}'' \\ | & | \\ \text{R}-\text{C}-\text{CH}-\text{CCl}_3 \\ | \\ \text{R}' \end{array}$$

where R is a radical selected from the group consisting of the phenyl, naphthyl, pyrryl, thienyl and furyl series, the heterocyclic group in each case containing conjugated double bonds; R' is selected from the group consisting of hydrogen, alkyl, phenyl, chlorophenyl, alkoxy phenyl and thienyl; R'' is selected from the group consisting of hydrogen, phenyl, halophenyl, carboxy, carbalkoxy, alkoxy, aryloxy, alkoxymethyl, methylol and acyloxy methyl, which comprises heating from 0.5 to 20 molar equivalents of trichloromethane sulfonyl chloride with one molar equivalent of a compound of the formula $$\begin{array}{c} \text{R}'' \\ | \\ \text{R}-\text{C}=\text{CH} \\ | \\ \text{R}' \end{array}$$

where R, R' and R'' are as previously defined, at a temperature of 25 to 125° C. with the elimination of sulfur dioxide.

2. The process of preparing 1,3,3,3-tetrachloropropylbenzene which comprises heating from 0.5 to 20 molar equivalents of trichloromethane sulfonyl chloride with one molar equivalent of styrene at a temperature of 25 to 125° C. with the elimination of sulfur dioxide.

ELBERT C. LADD.
LEWIS Y. KILEY.

REFERENCES CITED

The following references are of record in the file of this patent:

UNITED STATES PATENTS

| Number | Name | Date |
|---|---|---|
| 2,468,208 | Kharasch | Apr. 26, 1949 |

FOREIGN PATENTS

| Number | Country | Date |
|---|---|---|
| 880,403 | France | Mar. 25, 1943 |

OTHER REFERENCES

Sturgis, Ind. & Eng. Chem., vol. 39, pp. 64–68 (1947).

Kharasch, Science, 102, 128, August 3, 1945.

Kharasch, J. Am. Chem. Soc., 69, 1100–5, May 1947.